United States Patent [19]

Tomasini et al.

[11] Patent Number: 5,978,025
[45] Date of Patent: Nov. 2, 1999

[54] ADAPTIVE OPTICAL SENSOR

[75] Inventors: Alfredo Tomasini, Acqui Terme; Gianluca Colli, Sannazzaro de' Burgondi; Ernestina Chioffi, Pavia; Danilo Gerna, Montagna, all of Italy

[73] Assignee: STMicroelectronics S.r.l., Agrate Brianza, Italy

[21] Appl. No.: 08/754,589

[22] Filed: Nov. 20, 1996

[30] Foreign Application Priority Data

Nov. 21, 1995 [EP] European Pat. Off. ............... 95830485

[51] Int. Cl.[6] .................................................... H04N 3/14
[52] U.S. Cl. .......................... 348/302; 348/298; 348/308
[58] Field of Search .................................. 348/300, 302, 348/304, 308, 295, 298, 296

[56] References Cited

U.S. PATENT DOCUMENTS

| | | | |
|---|---|---|---|
| 4,544,848 | 10/1985 | Kawasaki et al. | 348/298 |
| 4,775,798 | 10/1988 | Munier | 348/295 |
| 5,019,702 | 5/1991 | Ohzu et al. | 348/302 |
| 5,572,257 | 11/1996 | Conrads et al. | 348/308 |
| 5,576,762 | 11/1996 | Udagawa | 348/296 |
| 5,698,844 | 12/1997 | Shinohara et al. | 348/300 |
| 5,708,471 | 1/1998 | Okumura | 348/308 |
| 5,781,233 | 7/1998 | Liang et al. | 348/302 |

FOREIGN PATENT DOCUMENTS

| | | |
|---|---|---|
| 0616464 | 9/1994 | European Pat. Off. . |
| 0 630 152 | 12/1994 | European Pat. Off. . |

OTHER PUBLICATIONS

Patent Abstracts of Japan, vol. 007, No. 040 (E–159), Feb. 17, 1983, and JP–a–57 190469 (Nippon Victor KK), Nov. 24, 1982.

*Primary Examiner*—Wendy Garber
*Assistant Examiner*—Luong Nguyen
*Attorney, Agent, or Firm*—Allen, Dyer, Doppelt, Milbrath & Gilchrist, P.A.

[57] ABSTRACT

An integrated image processing system includes an array of cells arranged in rows and columns. Each cell corresponds to a pixel of an image and includes a photosensitive element for detecting the luminous intensity of its respective pixel and for generating a value. A first switch controls the transfer of the value from a respective photosensitive element to the corresponding capacitor, which stores the value. A second switch couples each of the cells in parallel to a common line. A control circuit receives the values from each cell on the common line and generates a signal for regulating the switching time interval of the first switch.

18 Claims, 6 Drawing Sheets

ADAPTIVE OPTICAL SENSOR

CROSS-REFERENCE TO RELATED APPLICATION

This application claims priority from EP 95830485.9, filed Nov. 21, 1995, which is hereby incorporated by reference.

BACKGROUND AND SUMMARY OF THE INVENTION

The present invention relates to monolithically integrated image processing systems and more in particular to an adaptive optical sensor, monolithically integrated together with control and image processing circuitry.

Integrated optical sensors are becoming very useful in a number of application fields. Fundamentally, the sensor constitutes the image detector (video camera) in a certain format, for example in the QCIF format (176×144 pixels) and advantageously is monolithically integrated with the processing and control circuit. Integrated sensors of this type are useful in industry for realizing cameras suitable for functioning in hostile environments, for alarm and monitoring systems, for implementing of intelligent motion sensors and for filming in multimedia environments, PC, low OCR resolution, FAX and the like.

The following publications treat various aspects of the state of the art technology used for fabricating this type of optical sensors, all of which are hereby incorporated by reference.

"An Object Position and Orientation IC with Embedded Imager", David L. Standley, JSSC Vol. 26, n. Dec. 12, 1991;

"Smart Sensor Interface with A/D Conversion and Programmable Calibration", P. Malcovati, C. Azzeredo Leme, P. O'Leary, F. Maloberti and H. Baltes, JSSC Vol. 29, n. Aug. 8, 1994;

"A New MOS Imager Using Photodiode as Current Source", Mikio Kyomasu, JSSC Vol. 26, n. Aug. 8, 1991;

"Image Motion Detection Using Analog VLSI", Chu Phoon Chong, C. Andre, T. Salama and K. C. Smith, JSSC Vol. 27, n. Jan. 1, 1992, "Smart Pixel Cellular Neural Network in Analog Current Mode CMOS Technology", S. Espejo et al., JSSC Vol. 29, n. Aug. 8, 1994;

"A 256×256 CMOS Active Pixel Image Sensor with Motion Detection", A. Dickinson, et al., ISSCC ISSN 0193-6530, February 1995, San Francisco.

The photosensitive portion of the integrated device is commonly constituted by an array or matrix of elementary cells, each corresponding to a pixel of a picked-up image (frame). The photodetector member of each cell may be a phototransistor or a photodiode. The luminous intensity of each pixel of an image optically projected over the area occupied by the array of photosensitive cells can be detected in terms of the current photogenerated by the photodetecting component of the respective cell.

The reading of an image detected by the array of photosensitive cells takes place by scanning the cells in cyclic succession, usually row by row. For each row of selected cells, the values relative to the single pixels of the row are commonly read in a parallel mode by a number of reading circuits equal to the number of pixels per row (i.e. equivalent to the number of columns of the photosensitive array). The values, read simultaneously for all the pixels of a selected row are "discharged" in a parallel mode, for example through a parallel-to-serial converter, in order to produce as output, a serial video signal including appropriate row synchronism pulses.

An alternative to the use of phototransistors or photodiodes is photomodulated sources of a current proportional to the luminous intensity, which, adequately amplified, provides a pixel signal that may be sampled in the reading phase, stored and/or processed in various ways according to particular algorithms. The common use of a photodiode and of an associated capacitance that may be switched in parallel to the diode for a preestablished period of time for storing the value of luminous intensity of the respective pixel in terms of electric charge, has the advantage of allowing for a great simplification of the integrated structure of the individual cell.

Transfer of the charge photogenerated by the photodiode to the respective storing capacitance can be controlled by a dedicated integrated switch.

Normally, the subsequent reading destroys the information (pixel) temporarily stored in the cell capacitance, thus resetting the state of charge of the storing capacitance to a preset level. Therefore, the cell is ready again to record the next frame.

The reading of the state of charge of the capacitance is commonly enabled by a dedicated integrated read select switch, capable of coupling the storing capacitance of the cell (pixel) to the input of a charge amplifier, common for all the cells of a column of the cell array (that is, for pixels of the same order of all the rows).

A typical cell arrangement in rows and columns is shown in FIG. 1. The figure schematically illustrates the read select switches Rs and the array of the reading charge amplifiers Ra.

A frame is read selecting one row at the time in succession. The pixel values, produced at the outputs of the charge amplifiers Ra, for each selected row, are delivered in parallel and converted into a serial signal by a dedicated parallel-to-serial converter circuit (not shown in the figure).

These systems require means for preventing saturation of the photosensitive elements (cells) and optimizing, that is adapting the sensitivity of the sensor to the illumination conditions of the scene or of the filmed subject. This requisite is of paramount importance because the variation of illumination between successive frames has a great impact on the global performances algorithm of analysis, principally based on the luminance component of the frames, especially so in the case of black and white videocameras.

Commonly, this function is electronically implemented through normal automatic gain control (AGC) loops, in function of luminance. A luminance signal can be generated in various ways. Often it is obtained from a dedicated sensor (exposure meter), integrated on the same device. In other systems, an average value of the frame luminance is obtained by processing the video signal itself. As a whole, the known systems rely on controlling the gain of a video signal amplifier, "downstream" of the sensor, through automatic gain regulation techniques.

These sensitivity regulation systems are intrinsically complex. There is a need and/or utility of an "adaptive" sensor, capable of automatically implementing a control of its own sensitivity in function of the illumination level of the filmed subject, that is of the luminance of each frame without requiring the realization of burdensome signal processing circuits.

This aim is fully attained by the present invention whose object is a method and relative sensor's architecture, capable of exerting a sensitivity control of the optical sensor in response to the level of illumination of the subject or of the frame's luminance.

Therefore, control is implemented at each photogram (frame) by the sensor in an essentially adaptive way.

In a sensor operating in a cyclic mode that stores each frame in the form of electric charge, a preferred method of the invention consists of detecting, during a first phase of each cycle, the value of the global electric current resulting from the sum of the currents photogenerated by all the photosensitive elements that make up the sensor and in regulating the (shutter) closing interval of the switches through which the photogenerated current is integrated in the storage capacitance of each photosensitive cell, substantially in accordance with an inverse proportionality law in function of the preliminary assessed level of the global current.

The successive "reading" of the charge level of the storage capacitance, that corresponds to the relative intensity value of each pixel of the frame, eventually produces a video signal whose amplitude has already been adjusted on the ground of the frame's luminance level, without the need of further signal processing and compensation of the video signal.

According to an important aspect of the invention, this sensor adaptivity can be implemented with a particularly simple cell structure, realizable in a completely compatible way by a standard CMOS fabrication process, as it shown hereafter.

The processing circuitry of the global current and that for generating the appropriate control signals that establish the interval of integration of the current photogenerated in each photosensitive element, typically a photodiode, in its respective storage capacitance, in function of the preliminary measured global photogenerated current, can be realized in an essentially analog form or in an almost entirely digital form. Alternatively, its function can be partly implemented by processing via software an information relative to the global current in order to generate, via software, the desired time interval during which the frame's pixel values are stored as electric charge.

According to a fundamental aspect of the invention each individual cell comprises, in integrated form, beside its photosensitive structure, for example a photodiode, a storage (MOS) capacitance, a first switch for coupling the storage capacitance in parallel to the photodiode and a second read-select switch (discharge) for discharging the electric charge stored in the capacitance through the input of the charge amplifier (reading amplifier), and also a third integrated switch. The latter has the function of connecting in parallel all the sensor photodiodes to a common line during an initial phase of each cycle. During this first phase of each cycle, the global current photogenerated by all the sensor cells is coupled, through a low impedance coupling circuit, to the input of a resettable charge amplifier. Therefore, the voltage ramp of the output node of the charge amplifier can be compared with a reference voltage by a comparator.

The interval of time between the initial instant of a new cycle and the triggering of the comparator provides the primary information for enabling, based on other prearrangeable parameters, the closing time of the switch for integrating the photogenerated current of the photodiode its respective storage capacitance, thus implementing the desired adaptive function of the sensor to the changing illumination conditions, on a frame-by-frame basis. In practice, the system of the invention implements an automatic regulation of a parameter that can be equated to the exposure time (i.e. the shutter of a classical camera system). In other words, the invention realizes an electronic shutter whose opening time is automatically regulated in terms of illumination condition of the subject, on a frame-to-frame basis.

BRIEF DESCRIPTION OF THE DRAWING

These and other aspects and advantages of this invention will be even more evident through the following description of some important embodiments and by referring to the enclosed figures, wherein.

DETAILED DESCRIPTION OF THE PREFERRED EMBODIMENTS

Figure 2:
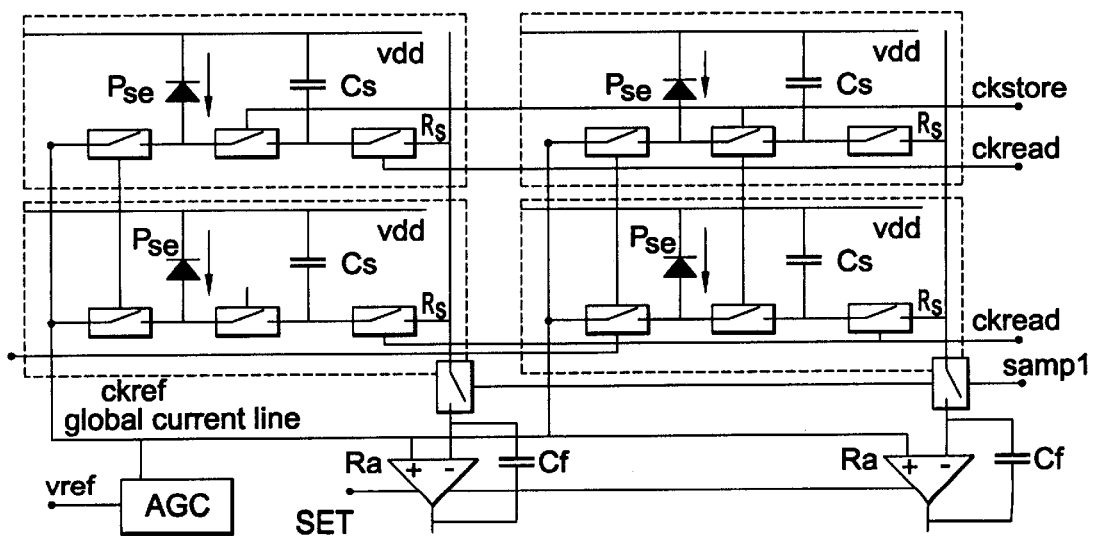
FIG. 2 is a basic scheme of the cells of an adaptive sensor realized according to the present invention.

The numerous innovative teachings of the present application will be described with particular reference to the presently preferred embodiment (by way of example, and not of limitation), in which:

The architecture of the single cells and their arrangement in an adaptive sensor realized according to the present invention is schematically shown in FIG. 2. In the partial scheme of this figure are illustrated four elementary cells and the respective scheme of electric connection during the different phases of each cycle of capture and storage of an image.

Each cell includes a photosensitive element Pse, a storage capacitance Cs, and three switches: CKREF, CKSTORE and CKREAD, respectively, which are controlled by the homonymous control signals. Among these, the CKREF signal controls, in common, the relative switches of all the cells that make up the sensor. The CKREF switches connect in common (that is in an OR configuration) all the photosensitive cells, that is the photosensitive elements Pse, each constituted for example by a photodiode, to a unique line GLOBAL CURRENT LINE of photogenerated current. This common line, besides constituting an input of the block AGC of adaptive autoregulation of the sensor, is also coupled to a noninverting input of all the reading charge amplifiers (integrators) Ra of the sensor to provide a common reference, identical to that of the cells.

All the CKSTORE switches are also commanded in common to close for a certain interval of time during which the photogenerated current in each photodiode is stored (integrated) as electric charge in the respective storage capacitance Cs, thus storing the image in the form of an electric charge.

By contrast, the read select switches Rs of the cells are controlled, in sequence, row by row, by the control signal CKREAD. They allow the reading of the pixel value stored as electric charge in the capacitance Cs during the preceding frame storing phase, by coupling the capacitances Cs of the selected row of cells to the respective input lines of the reading charge amplifiers Ra.

The scheme of FIG. 2 shows the employment of a switch SAMP1 on the read lines of the sensor. The use of such a switch is optional although highly preferable. Its function is that of preventing the integration of the charge due to the leakage currents. In fact, each read line has an intrinsic capacitance towards ground that is charged (or discharged) by the leakage current of the junctions of the devices that make up the CKREAD switches of the cells. It is important to prevent the integration of this leakage current on the reading charge amplifier when the signal on the integration capacitance $C_f$ of the charge amplifier becomes available as output through a multiplexer. The switch SAMP1 isolates the read line from the input of the charge amplifier, preventing the leakage current to be integrated on the parasitic capacitance of the read line. By closing the switch SAMP1 the read line is properly "reset" before each reading phase (at each cycle). The switch SAMP1 is simultaneously closed during the reset phase of the reading charge amplifier and during the interval between successive switchings of the rows scanning signal CKREAD.

When all the three switches associated to each cell are p-channel devices, the control signal of the SAMP1 switches is a function of the logic signals CKREAD and SET:

SAMP1=SET or CKREAD.

Figure 3:
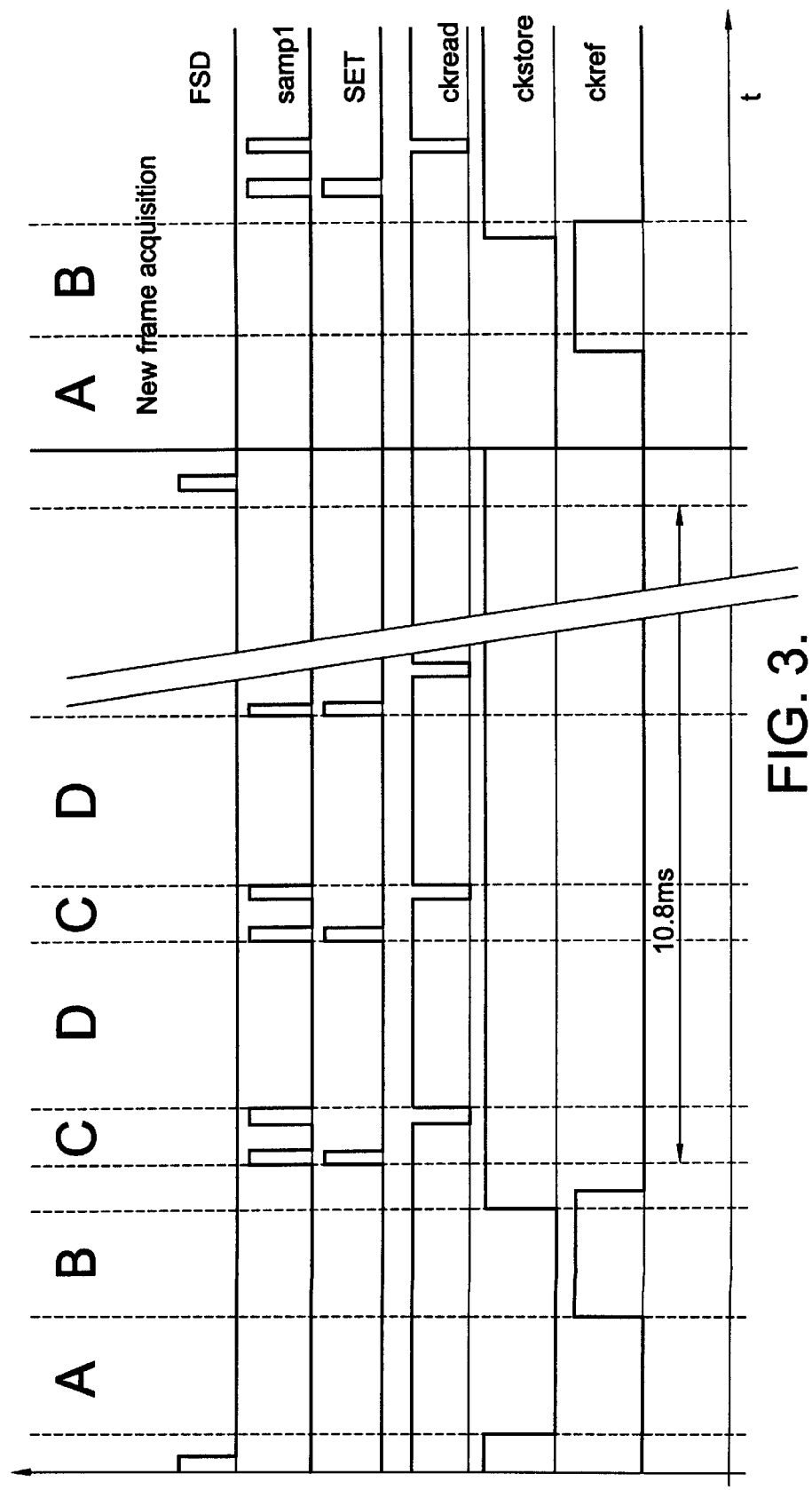
FIG. 3 shows the timing diagrams for the adaptive sensor shown in FIG. 2.

The relevant respective timing diagrams are shown in FIG. 3. FIG. 3 represents a frame acquisition cycle by a QCIF format (176×144 pixels) camera.

During a first phase of the cycle identified as A in FIG. 3, reading of the global current generated by the sensor is performed by the automatic control circuit of the invention which produces a definition of the time interval of the successive phase B.

During phase B, the image is stored in the form of electric charge in the storage capacitance of the cells of the sensor. The charge of the storage capacitance occurs for an interval of time that is automatically determined by the control system during the preceding phase A.

Figure 4:
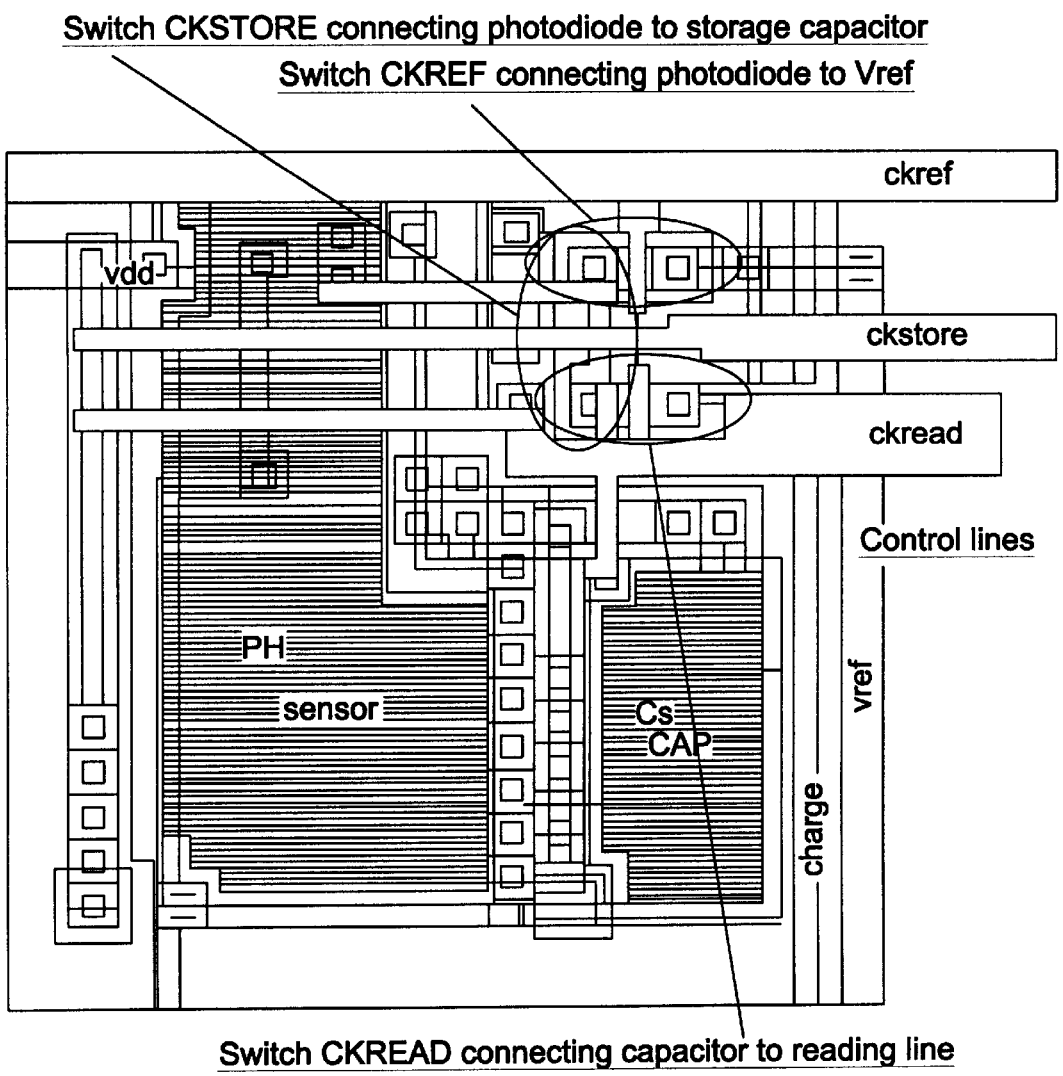
FIG. 4 is a layout of a single cell of an adaptive sensor according to the present invention.

During phase C the reset of the reading charge amplifiers and of the global current line takes place through the SET command and the successive reading of the charge stored in the various storage capacitances of the sensor through the CKREAD command. This is followed by the output of the read information through a parallel-to-serial conversion that is indicated identified in FIG. 3 as phase D. In the example considered, 144 of these successive phases C+D will occur, in other words one for each sensor line. The total outputting time of the pixel signals is of 10.8 ms in the example considered. At the end of the 144 C+D phases, all the pixel values are read and outputted so that the image (frame) acquisition cycle will be concluded and a new cycle may start. Each of new cycle of acquisition begins with a FSD (Frame Start Detector) pulse. The layout of a single cell according to a particularly efficient form of integration is shown in FIG. 4. The shaded regions highlight the photodiode area, the area of the storage capacitance as well as the areas of the MOS devices that implement the three switches CKREF, CKSTORE and CKREAD which control the different phases of a cycle of operation of the cell.

These distinct phases of operation can by summarized according to the following table, where beside the state of the switches CKSTORE and CKREF, are also indicated, by way of an example, the respective timing intervals or preestablished limits of variation of the intervals, according to the requirements of the specific application of the sensor.

| PHASE OF OPERATION | DESCRIPTION | CKREF | CKSTORE | TIME INTERVAL |
|---|---|---|---|---|
| Evaluation phase | Detection of the start FSD pulse of a new acquisition cycle and Start of the measuring of the photogenerated current | 0 | 0 | from 6.25 μs to 62.5 μs |
| Integration phase | Exposure interval (electronic shutter) | 1 | 0 | from 1.5 ms to 10.5 ms |
| Waiting phase | Waiting phase for a new frame acquisition cycle (FSD) | 0 | 1 | |
| Reset phase | A new FSD pulse resets the logic circuit and a new cycle begins at the next clock front | 0 | 1 | ≈400 ns |

Figure 5:
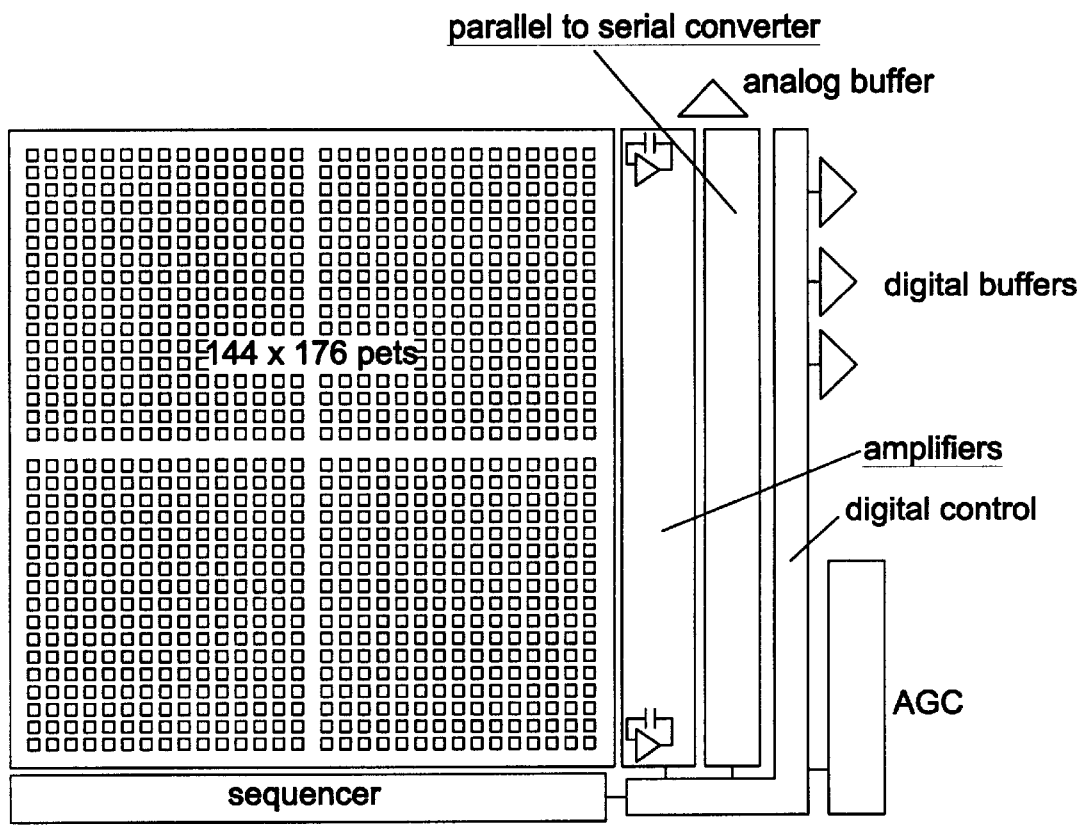
FIG. 5 is a block diagram of a videocamera realized according to the present invention.

FIG. 5 is a block diagram of a QCIF format (176×144 pixels) camera according to the present invention. The sensor is indicated by the 144×176 pels (pels=pixels) module, the SEQUENCER block represents the pixel scanning circuit of the sensor. The AMPLIFIERS block represents the array of the reading charge amplifiers. The PARALLEL-TO-SERIAL CONVERTER receives the output signals of the charge amplifiers and converts them in a serial signal that is made available at the ANALOG BUFFER output. The digital control circuit of the different phases is represented by the DIGITAL CONTROL BLOCK, whereas the circuit that implements the adaptive function of the invention is generically indicated as the AGC block.

Figure 6:
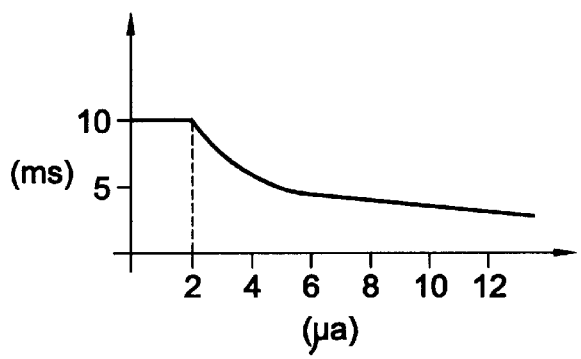
FIG. 6 is a diagram that shows the maximum "exposition" time that can be electronically determined by the adaptive automatic gain control system of the invention.

FIG. 6 shows an operative diagram of the effects of the automatic control system of the "gain" of the optical sensor in function of the level of the global photogenerated current monitored during an initial phase of each cycle. In practice, this system, which realizes an electronic shutter, has a first function of establishing the maximum exposure time, in response to lower and lower illumination levels of the scene to be filmed.

Depending on the type of application of the sensor, such a maximum limit can be established in function, for example, of the ability of the human eye of perceiving images of increasing low luminance. This limiting function is easily implemented by defining a minimum threshold value of the global photogenerated current, that in the illustrated example of FIG. 6, may be 2 μA, below which a maximum closing interval of the CKSTORE switches may correspond, so as to record an image in the form of electric charge stored in the storage capacitors Cs of the cells of the sensor, in a limit interval of about 10 ms.

Of course, if the sensor is to be used in certain image processing applications, for example in anticollision systems or in systems for preventing vehicles to go off course, where it is vital to ensure functionality of a real time analysis of the images picked up by the sensor even under very low luminance conditions (e.g. inside tunnels or during night travelling), such a minimum threshold can be lowered, consistently with the intrinsic signal to noise ratio characteristics of the photosensitive element or structure of the cells of the sensor.

As already mentioned, the system of the invention is based on a preventive estimate of luminance during a first phase of each frame acquisition cycle by sensing the level of the global current photogenerated by the whole array of photosensitive cells. The estimate of such a photogeneration level, directly tied to the irradiance of the filmed subject, may be realized by integrating the global photogenerated current on the integration capacitance of an appropriate charge amplifier, capable of producing a ramp signal whose gradient is representative of the level of the global photogenerated current.

Nevertheless, taking into account the relatively high capacitance of the lines, it is of paramount importance to ensure a coupling of very low impedance. Considering that the node is capable of picking up all the photogenerated current which has a considerable capacitance, it is fundamental that this node be a node of very low impedance to prevent deteriorating speed characteristics. Each photosensitive element loads this low impedance node with a capacitance that is the sum of the photodiode junction capacitance and of the storage capacitance. The sum of these two capacitances can be of about 500 pF, which multiplied by the total number of cells, brings the value of the total capacitance to about 13 nF. For these reasons it is highly recommended to employ a dedicated coupling circuit between the node represented by the common current line to which all the photodiodes of the sensor are connected in an OR configuration through the respective CKREF switches, during the initial phase of each cycle.

Figure 8:
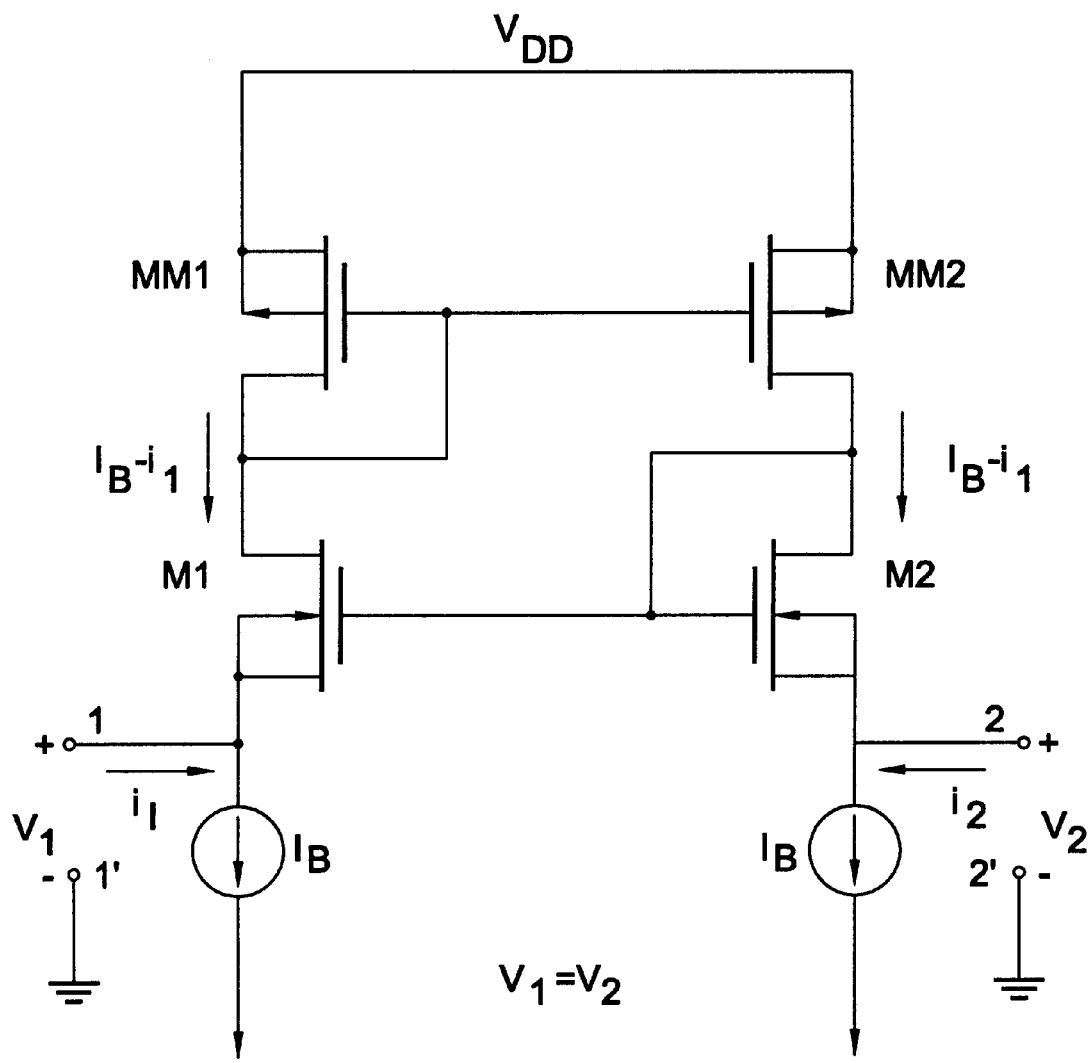
FIG. 8 shows a coupling circuit of low input impedance used in a preferred embodiment of the invention.

Of course, any coupling circuit of low input impedance, known in the art, can be successfully used. A coupling circuit, particularly capable of providing a very low input impedance is illustrated in FIG. 8. The negative input impedance converter shown in FIG. 8 is a two-port whose input impedance is the negative of the load impedance. In this arrangement, any input signal current $i_1$ at port 1 flows through M1 (assuming $I_B$ to be an ideal current sink), causing its drain current to be $I_B-i_1$. The unity-gain current mirror MM1, MM2 forces an identical current through the diode-connected transistor M2 to the output port 2. The current sink $I_B$ causes the output current $i_2$ to equal $i_1$ and hence the output voltage $v_2$ across terminating resistance $R_T$ is $$v_2 = -i_1 R_T.  \qquad [1]$$

If channel-length modulation effects in M1 and M2 can be ignored, their gate-source voltages are equal since they are carrying equal currents. As a result, the input voltage $v_1$ is given by $$v_1 = v_2 = -i_1 R_T.  \qquad [2]$$

This is a current-controlled negative resistance of magnitude $R_T$ at the input port.

The circuit that processes the information relative to the illumination level of the scene provided by the gradient of the output ramp of a charge amplifier and generates a CKSTORE command, whose duration is regulated in accordance with a law of inverse proportionality with the predetected level of the global photogenerated current, can be realized in different ways. As an alternative, its function can be partially performed via software by arranging an analog-to-digital conversion of the primary information supplied by the charge amplifier of the global photogenerated current to provide a basic digital information that can be processed via software according to regulation criteria chosen by the operator.

Figure 7:
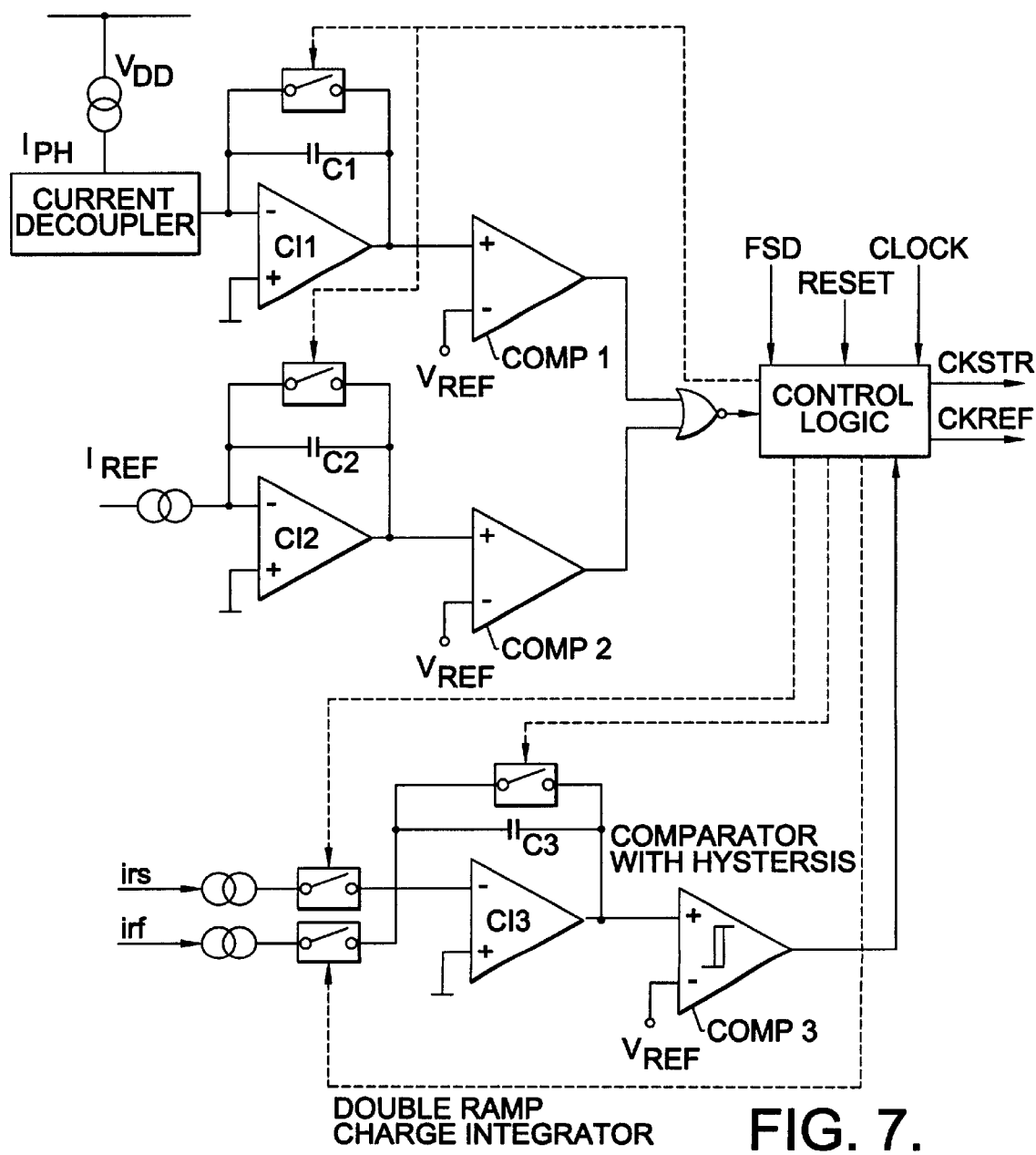
FIG. 7 is a block diagram of an adaptive control circuit according to an embodiment of the invention.

An embodiment of the control circuit is shown in FIG. 7. In the scheme of FIG. 7, the current generator Iph symbolically represents the whole sensor during a phase of OR connection of all the photosensitive elements through the respective CKREF switches to a unique output node through which is available the global photogenerated current.

The CURRENT DECOUPLER block has the function of providing a low coupling impedance with the output node represented by the common photogenerated current line. The input impedance of the CURRENT DECOUPLER block should have a value in the order of 10 ohms, and not higher than 100 ohms. The circuit described in the above mentioned article is perfectly fit for the purpose.

The global photogenerated current Iph is integrated by the resettable charge amplifiers CI1, whose output ramp drives the input node of a comparator COMP1 which switches at the instant in which the output voltage of the charge amplifier CI1 reaches a preestablished reference value. The voltage on the output node of the charge amplifier CI1, starting from a "reset" condition in which the output voltage can be for example 4 V, drops with a ramp whose gradient, depending on the value of the integration (feedback) capacitance C1 may be in the order of 500 pF, is proportional to the input current Iph. The reference voltage (triggering threshold) of the comparator COMP1 may be fixed at 1.5 V, for example, so as to define a usable excursion range of 2.5 V for the output voltage of the charge amplifier CI1.

The limit of adaptivity of the sensor, that is, of the automatic control system of the luminance may be established for example by "duplicating" the circuit constituted by the charge amplifier and by the comparator and by feeding the input of the second resettable charge amplifier CI2 having an integration (feedback) capacitance C2 of about 5 pF, a preestablished current Iref, through a common adjustable current generator, equivalent to the minimum threshold of global photogenerated current that should be preestablished for inhibiting the adaptive capacity of the sensor below a certain minimum level of irradiance of the filmed subject.

The output of the two comparators COMP1 and COMP2 are combined in OR by means of a dedicated logic gate so as to provide a logic step command of the reading phase of the level of the global photogenerated current to a logic control circuitry. The logic control block CONTROL LOGIC receives the pulse start FSD of a new frame acquisition, storage, and reading cycle, a timing signal CLOCK, and a reset command of all the reading charge amplifiers as well as of the charge amplifiers CI1, CI2 and CI3 of the control circuit and of any other device that must be reset to a certain state before carrying out a new working cycle such as the state of the comparators COMP1, COMP2 and COMP3. The control circuit generates the control phase CKREF, as well as the control signal of the RESET switches and of the switches that select the input currents Irs and Irf of the double ramp generator, thus producing the regulated phase CKSTORE that controls the closing of the frame storage switches of the cells of the sensor.

The closing command for a regulated interval of time of the switches CKSTORE can be produced, according to the embodiment of FIG. 7, by employing a double ramp generator realized by a third charge amplifier CI3, onto the input node of which a first reference current Irs and a second reference current Irf of opposite sign may be switched. The output of the charge amplifier CI3 drives the input of a third comparator COMP3 of the hysteresis type capable of supplying respective logic commands to the control logic circuit.

The functioning of the circuit of FIG. 7 can be described by referring to the functioning phases indicated in the table already shown above.

ESTIMATION PHASE OF THE INTEGRATION INTERVAL (TDP)

The global photogenerated current Iph is read by the decoupling block CURRENT DECOUPLER, which supplies a low resistive type impedance, lower than 100 ohms. The current is integrated by a charge integrator CI1 which starts from a condition whereby its output level has been reset to 4 V. The integrated current will tend to lower the output voltage until it reaches a reference voltage for example of 1.5 V. In practice, the integration interval of the current generated by the photodiodes is proportional to the time required by the output level of the amplifier CI1 to go from a voltage of 4 V to a voltage of 1.5 V. It is important to point out that this interval of time is inversely proportional to the total photogenerated current Iph. By calling C1 the integration capacitance and knowing that the output voltage swing of the amplifier is of 2.5 V, the time taken by the amplifier to accomplish such an excursion can be obtained with the following equation:

$$T = 2.5 * C1/Iph \qquad [3]$$

The output voltage of the charge amplifier CI1 commands the comparator COMP1 that triggers when its input (+) drops below 1.5 V.

During this phase, the S3 switch is closed and the current Irf delivered by the amplifier CI3, tends to rise the output voltage of CI3 until the comparator COMP3 triggers.

INTEGRATION PHASE

During this phase, CI1 is in a stand-by condition. The switch S3 opens while S4 closes. In this precise instant the output voltage (V3) of CI3 is exactly equal to:

$$V3 = Vref(1.5\ V) + T * Irf/C3 \qquad [4]$$

which, considering equation [3], becomes:

$$V3 = Vref + 2.5 * C1 * Irf/(C3 * Iph) \qquad [5].$$

The current Irs has an opposite sign of Irf, thus, V3 drops with a gradient given by Irs/C3. This continues until V3 becomes equal to Vref triggering the hysteresis comparator COMP3, and generating a logic signal which indicates to the control logic that the integration phase is completed.

The duration of the integration phase is therefore equal to the time T multiplied by the ratio Irs/Irf, so that possibility for regulating the integration time consists of changing the ratio between these two currents.

In reality, the comparator COMP3 triggers at a slightly lower voltage due to the fact that the comparator is provided with a hysteresis (for example of about 50 mV) which is introduced for preventing possible oscillation phenomena when the input level remains in the vicinity of the reference voltage Vref.

There exists the problem, under conditions of scarce illumination, that the integration time will be expanded beyond the allowable limit (it should be remembered that the exposure time should be inversely proportional to the average total radiant power). Therefore, a maximum limit of this interval, is introduced by employing an amplifier CI2 identical to CI1, controlling a respective comparator COMP2, into which a reference current Iref is injected that triggers the comparator COMP2 after a certain maximum interval of time that may be fixed by adjusting the injected current. An OR gate triggers when one of the two comparators (no matter which) triggers. In general, under sufficient or high illumination, the comparator COMP1, controlled by CI1, will trigger, while under scarce illumination the comparator COMP2 controlled by CI2 will trigger so as to establish a limit to the adaptivity of the sensor below a certain minimum level of illumination.

Of course, the current Irs and Irf can also be generated by constant current generators that may be regulated for defining the law of dependency of the closing time of the CKSTORE switches from the global current level Iph, as measured during the first phase of each new frame acquisition cycle.

As it will be obvious to a person skilled in the art, the adaptive automatic control circuit of this invention can also be realized in a different way from that described in relation to the scheme of FIG. 7. For example, the automatic control circuit can be realized in a purely digital form instead of in an analog form as shown in FIG. 7. The information relative to the detected level of the global photogenerated current can be digitized, and in this form digitally processed so as to obtain a control phase that determines the duration of the integration time of the frame in the form of electric charge, in function of parameters set by the operator.

According to a disclosed class of innovative embodiments, there is provided: an integrated image processing system, comprising: an array of cells arranged in rows and columns, each said cell corresponding to a pixel of an image, each said cell comprising: a photosensitive element connected to detect the luminous intensity of its respective said pixel and to generate a corresponding value, a capacitor connected to store said corresponding value, a first switch connected to control the transfer of said corresponding value from its respective photosensitive element to its respective capacitor, and a second switch connected to couple each of said cells in parallel to a common line; and a control circuit having an input for receiving said values from each of said cells on said common line, and an output connected to generate a signal to regulate the switching time interval of said first switch.

According to another disclosed class of innovative embodiments, there is provided: an adaptive image element, comprising: an array of cells arranged in rows and columns, each said cell corresponding to a pixel of an image, each said cell comprising: a photosensitive element connected to detect the luminous intensity of its respective said pixel and to generate a corresponding value, a capacitor connected to store said corresponding value, a first switch connected to control the transfer of said corresponding value from its respective photosensitive element to its respective capacitor, a second switch connected to couple each of said cells in parallel to a common line, and a read select switch connected to discharge its respective capacitor and to couple its respective capacitor to a reading charge amplifier of its respective column, said reading charge amplifier connected to deliver each of said values in parallel to a parallel-to-serial converter circuit; and a control circuit having an input for receiving said values from each of said cells on said common line, and an output connected to generate a signal to regulate the switching time interval of said first switch.

According to another disclosed class of innovative embodiments, there is provided: a method for adapting the sensitivity of an image element, comprising the steps of: (a) during a first phase of a frame acquisition cycle: reading the current generated by each cell in an array of cells using a control circuit, each said cell comprising a photosensitive element connected to detect the luminous intensity of its respective said pixel and to generate a corresponding value, a capacitor connected to store said corresponding value, a first switch connected to control the transfer of said corresponding value from its respective photosensitive element to its respective capacitor, and a second switch connected to couple each of said cells in parallel to a common line, said common line delivering the current of each of said cells, and producing a signal to regulate the switching time interval of said first switch using said control circuit; and (b) during a second phase of a frame acquisition cycle: storing said value of each of said cells in its respective capacitor, reading the charge level of each said capacitor using a reading charge amplifier, and delivering said values in parallel to a parallel-to-serial converter circuit.

According to another disclosed class of innovative embodiments, there is provided: a method of adaptive control of the sensitivity of an optical sensor comprising an array of photosensitive elements, each associated to a storage capacitance for the photogenerated current, a first switch for storing of the photogenerated charge in said capacitance and a second switch for selecting said storage capacitance to read the charge stored therein, characterized in that it comprises: detecting during a first phase of each capture, storage and reading cycle of a frame the level of a global current photogenerated by the totality of said photosensitive elements; controlling the closing interval of said first switches in function of the level of said global current during a phase following said first phase.

According to another disclosed class of innovative embodiments, there is provided: an adaptive optical sensor comprising an array of cells, each comprising a photosensitive element, a first switch for storing the current photogenerated by the photosensitive element in a respective storage capacitance and at least a second switch for selectively reading the charge stored in said capacitance during a frame reading scan of said array, characterized in that: each cell comprises a third switch, driven in common to that of all the other cells of the array for connecting in an OR configuration all said photosensitive elements to produce a global photogenerated current; timing means capable of configuring said switches during distinct phases of each frame capturing, storing and reading cycle; means capable of regulating the closing interval of said first switches in function of the level of said global photogenerated current, detected during a first phase of each cycle.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. An integrated image processing system, comprising:
    an array of cells arranged in rows and columns, each said cell corresponding to a pixel of an image, each said cell comprising
        a photosensitive element connected to detect the luminous intensity of its respective said pixel and to generate a corresponding value,
        a capacitor connected to store said corresponding value,
        a first switch connected to control the transfer of said corresponding value from its respective said photosensitive element to its respective said capacitor, and
        a second switch connected to couple each of said cells in parallel to a common line; and
    a control circuit having an input for receiving said values from each of said cells on said common line, and an output connected to generate a signal to regulate the switching time interval of said first switch, said control circuit comprising a limiting circuit connected to inhibit the adaptive capacity of a sensor below a minimum level of luminous intensity, said limiting circuit comprising a second resettable charge amplifier receiving at an input thereof a reference current and having an output connected to drive an input node of a second ccmparator, said second comparator being connected to generate a logic signal indicating said minimum level.

2. The system of claim 1, wherein said control circuit comprises a resettable charge amplifier having an output for delivering a voltage to an input node of a comparator, said comparator being connected to compare said voltage with a reference voltage; and wherein said comparator switches when said voltage equals said reference voltage.

3. The system of claim 1, wherein said control circuit comprises a low imipedance coupling circuit connected to couple each of said values to an input of a resettable charge amplifier, said resettable charge amplifier having an output for delivering a voltage to an input node of a comparator, said comparator being connected to compare said voltage with a reference voltage; and wherein said comparator switches when said voltage equals reference voltage.

4. The system of claim 1, wherein said photosensitive element is a photodiode.

5. The system of claim 1, wherein each of said cells further comprises a read select switch connected to discharge its respective said capacitor and to couple its respective said capacitor to a reading charge amplifier of its respective column, said reading charge amplifier connected to deliver each of said values in parallel to a parallel-to-serial converter circuit; and a third switch connected to prevent the integration of leakage current on its respective reading charge amplifier.

6. The system claim 1, wherein said first switch is a p-channel MOS transistor.

7. An adaptive image element, comprising:
    an array of cells arranged in rows and columns, each said cell corresponding to a pixel of an image, each said cell comprising
        a photosensitive element connected to detect the luminous intensity of its respective said pixel and to generate a corresponding value,
        a capacitor connected to store said corresponding value,
        a first switch connected to control the transfer of said corresponding value from its respective said photosensitive element to its respective said capacitor,
        a second switch connected to couple each of said cells in parallel to a common line, and
        a read select switch connected to discharge its respective said capacitor and to couple its respective said capacitor to a reading charge amplifier of its respective columns said reading charge amplifier connected to deliver each of said values in parallel to a parallel-to-serial converter circuit; and
    a control circuit having an input for receiving said values from each of said cells on said common line, and an output connected to generate a signal to regulate the switching time interval of said first switch, said control circuit comprising a limiting circuit connected to inhibit the adaptive capacity of a sensor below a minimum level of luminous intensity, said limiting circuit comprising a second resettable charge amplifier receiving at an input thereof a reference current and having an output connected to drive an input node of a second comparator, said second comparator being connected to generate a logic signal indicating said minimum level.

8. The element of claim 7, wherein said control circuit comprises a resettable charge amplifier having an output for delivering a voltage to an input node of a comparator, said comparator being connected to compare said voltage with a reference voltage; and wherein said comparator switches when said voltage equals said reference voltage.

9. The element of claim 7, wherein said control circuit comprises a low impedance coupling circuit connected to couple each of said values to an input of a resettable charge amplifier, said resettable charge amplifier having an output for delivering a voltage to an input node of a comparator, said comparator being connected to compare said voltage with a reference voltage; and wherein said comparator switches when said voltage equals said reference voltage.

10. The element of claim 7, wherein said photosensitive element is a photodiode.

11. The element of claim 7, wherein each of said cells further comprises a third switch connected to prevent the integration of leakage current on its respective said reading charge amplifier.

12. The element claim 7, wherein said first switch is a p-channel MOS transistor.

13. A method for adapting the sensitivity of an image element, comprising the steps of:
(a.) during a first phase of a frame acquisition cycle:
(i.) reading the current generated by each cell in an array of cells using a control circuit, each said cell comprising a photosensitive element connected to detect the luminous intensity of its respective said pixel and to generate a corresponding value, a capacitor connected to store said corresponding value, a first switch connected to control the transfer of said corresponding value from its respective said photosensitive element to its respective said capacitors and a second switch connected to couple each of said cells in parallel to a common line, said common line delivering the current of each of said cells, said control circuit comprising a limiting circuit connected to inhibit the adaptive capacity of a sensor below a minimum level of luminous intensity, said limiting circuit comprising a second resettable charge amplifier receiving at an input thereof a reference current and having an output connected to drive an input node of a second comparator, said second comparator being connected to generate a logic signal indicating said minimum level, and
(ii.) producing a signal to regulate the switching time interval of said first switch using said control circuit; and
(b.) during a second phase of a frame acquisition cycle:
(i.) storing said value of each of said cells in its respective capacitor,
(ii.) reading the charge level of each said capacitor using a reading charge amplifier, and
(iii.) delivering said values in parallel to a parallel-to-serial converter circuit.

14. The method of claim 13, wherein said control circuit comprises a resettable charge amplifier, said resettable charge amplifier having an output for delivering a voltage to an input node of a comparator, said comparator being connected to compare said voltage with a reference voltage; and wherein said comparator switches when said voltage equals said reference voltage.

15. The method of claim 13, wherein said control circuit comprises a low impedance coupling circuit connected to couple each of said values to an input of a resettable charge amplifier, said resettable charge amplifier having an output for delivering a voltage to an input node of a comparator, said comparator being connected to compare said voltage with a reference voltage; and wherein said comparator switches when said voltage equals said reference voltage.

16. The method of claim 13, wherein said photosensitive element is a photodiode.

17. The method of claim 13, wherein each of said cells further comprise a third switch connected to prevent the integration of leakage current on its respective said reading charge amplifier.

18. The method of claim 13, wherein said first switch is a p-channel MOS transistor.

* * * * *

UNITED STATES PATENT AND TRADEMARK OFFICE
CERTIFICATE OF CORRECTION

PATENT NO. : 5,978,025
DATED : November 2, 1999
INVENTOR(S) : Tomasini et al.

Figure 1:
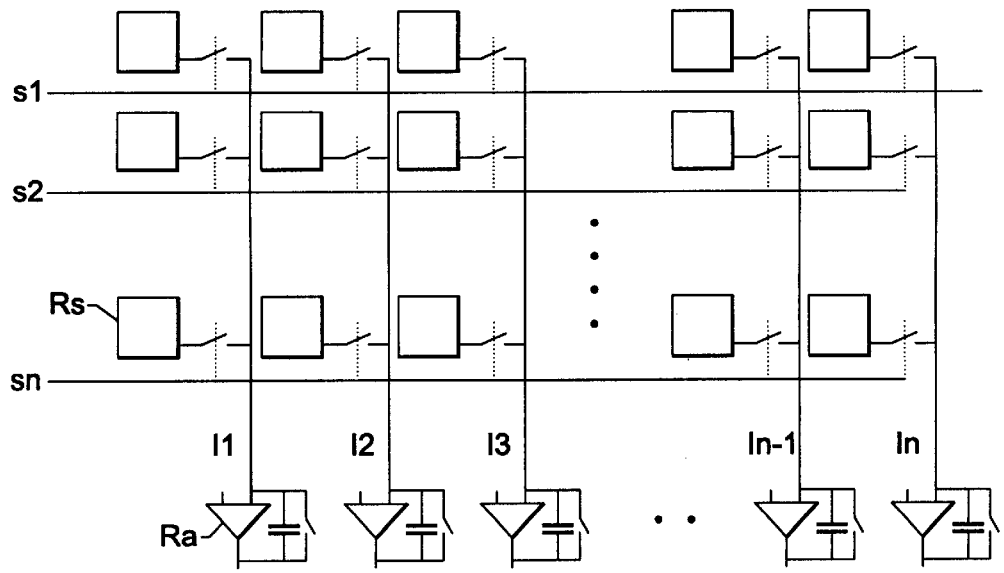
FIG. 1 shows, as previously mentioned, a typical organization of an array of rows and columns of photosensitive cells of a video sensor, each corresponding to a pixel of an image.

It is certified that error appears in the above-identified patent and that said Letters Patent is hereby corrected as shown below:

Figure 1        Strike Figure 1:

Insert:

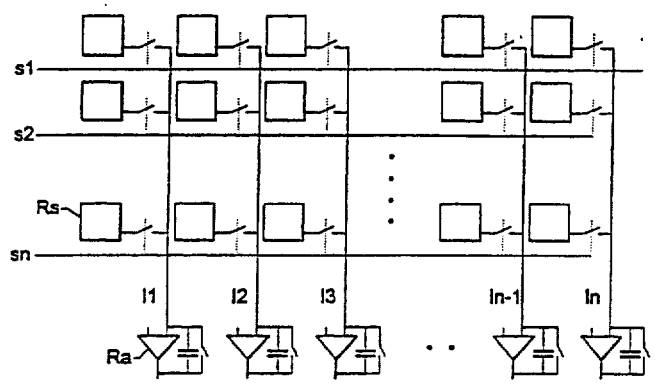

FIG. 1.
(PRIOR ART)

UNITED STATES PATENT AND TRADEMARK OFFICE
CERTIFICATE OF CORRECTION

PATENT NO.  : 5,978,025
DATED       : November 2, 1999
INVENTOR(S) : Tomasini et al.

It is certified that error appears in the above-identified patent and that said Letters Patent is hereby corrected as shown below:

| | |
|---|---|
| Column 11, line 47 | Strike: "Modifications and Variations" |
| Column 12, line 13 | Strike: "ccmparator" <br> Insert: --comparator-- |
| Column 12, line 23 | Strike: "imipedance" <br> Insert: --impedance-- |
| Column 13, lines 42-43 | Strike: "capacitors and" <br> Insert: --capacitors, and-- |

Signed and Sealed this

Sixth Day of June, 2000

Attest:

*Attesting Officer*

Q. TODD DICKINSON

*Director of Patents and Trademarks*